United States Patent
Testicioglu et al.

(10) Patent No.: US 9,979,653 B2
(45) Date of Patent: May 22, 2018

(54) SYSTEM AND METHOD OF PROVIDING IMPROVED THROUGHPUT CONTROL UNDER DELAY-BASED CONGESTION SITUATION IN A NETWORK

(71) Applicant: Citrix Systems, Inc., Fort Lauderdale, FL (US)

(72) Inventors: Mustafa Kutluk Testicioglu, Mountain View, CA (US); Georgios Tsolis, Patras (GR); Lampros Dounis, Patras (GR)

(73) Assignee: Citrix Systems, Inc., Burlington, MA (US)

( * ) Notice: Subject to any disclaimer, the term of this patent is extended or adjusted under 35 U.S.C. 154(b) by 78 days.

(21) Appl. No.: 14/919,205

(22) Filed: Oct. 21, 2015

(65) Prior Publication Data

US 2017/0118119 A1 Apr. 27, 2017

(51) Int. Cl.
*H04L 12/26* (2006.01)
*H04L 12/801* (2013.01)
*H04L 29/08* (2006.01)

(52) U.S. Cl.
CPC ............ *H04L 47/12* (2013.01); *H04L 43/087* (2013.01); *H04L 43/0864* (2013.01); *H04L 43/0888* (2013.01); *H04L 69/324* (2013.01)

(58) Field of Classification Search
None
See application file for complete search history.

(56) References Cited

U.S. PATENT DOCUMENTS

| | | | |
|---|---|---|---|
| 2002/0124096 A1* | 9/2002 | Loguinov | H04L 1/0001 709/230 |
| 2002/0150048 A1* | 10/2002 | Ha | H04L 1/1887 370/231 |
| 2009/0222553 A1* | 9/2009 | Qian | H04L 12/2602 709/224 |
| 2016/0323062 A1* | 11/2016 | Yang | H04L 1/0041 |

* cited by examiner

*Primary Examiner* — Minh-Trang Nguyen
(74) *Attorney, Agent, or Firm* — Allen, Dyer, Doppelt & Gilchrist, P.A.

(57) ABSTRACT

An apparatus and method of providing improved throughput on delay-based congestions comprising a packet engine and a delay-based congestion controller. The packet engine detecting a delay jitter that is caused by a layer 2 retransmission of a data packet, is configured to measure a round trip time (RTT) value. The delay-based congestion controller is configured to receive the RTT value and to determine a smoothed RTT (SRTT) value using the RTT value and one or more moving average functions. The delay-based congestion controller is also configured to, if the SRTT value is smaller than a set minimum SRTT value, assign the SRTT value to the set minimum SRTT value. The delay-based congestion controller is further configured to, if the SRTT value is larger than a set maximum SRTT value, assign the SRTT value to the set maximum SRTT value.

19 Claims, 9 Drawing Sheets

SYSTEM AND METHOD OF PROVIDING IMPROVED THROUGHPUT CONTROL UNDER DELAY-BASED CONGESTION SITUATION IN A NETWORK

BACKGROUND

The recent few years has witnessed an explosive growth of Internet traffic in networks, particularly in cellular wireless networks. This growth has been fueled by a number of new developments that includes faster, smarter, and more intuitive mobile devices such as the popular iPhone® series and the iPad® series, as well as faster wireless and cellular network technologies that deliver throughputs on par or better than fixed line broadband technologies. For many people today, a primary mode of access to the Internet is via mobile devices using cellular wireless networks. Users have come to expect the same or similar quality of experience as in fixed line broadband networks.

In general, cellular wireless networks have higher random packet loss and longer round trip time (RTT) than fixed line networks mainly because of versatile radio characteristics and restrictive data rates and bandwidths. Characterizing behavior and performance of mobile data services offered by cellular wireless networks is a challenging undertaking. The multitude of technologies (e.g., GPRS, CDMA, UMTS, and LTE), generations (e.g., 2.5G, 3G, and 4G), variations (EDGE, EVDO, HSPA, LTE-A), and mobile terminal classes, in conjunction with different requirements of various applications (e.g., web browsing, large file downloads, video streaming, and real-time communications) result in an enormous number of combinations and a highly variable and mixed environment.

Rapid growth of data traffic naturally has caused high congestion, and this congestion has resulted in losses and/or transmission delays of data packets over the air. Network operators have endeavored to develop various traffic management techniques to control explosive data traffic and to increase throughput on their systems, thereby providing satisfactory quality of service to their clients. Traffic management is a broad concept and includes techniques, such as directing certain classes of traffic to an optimization service, blocking or time shifting certain types of traffic, handling traffic under certain congestion situations, and so on.

In particular, optimizing traffic in congestion situations is one of many components in the array of traffic management techniques used by wireless network operators. Congestion control of data traffic can be performed in a transport layer. Transport layer congestion handlers are generally classified into two main categories: loss-based and delay-based.

SUMMARY

In some aspects, an apparatus of providing improved throughput on delay-based congestions is described. The apparatus comprises a packet engine and a delay-based congestion controller. The packet engine detecting a delay jitter that is caused by a layer 2 retransmission of a data packet, is configured to measure a round trip time (RTT) value. The delay-based congestion controller is configured to receive the RTT value and to determine a smoothed RTT (SRTT) value using the RTT value and one or more moving average functions. The delay-based congestion controller is also configured to, if the SRTT value is smaller than a set minimum SRTT value, assign the SRTT value to the set minimum SRTT value. The delay-based congestion controller is further configured to, if the SRTT value is larger than a set maximum SRTT value, assign the SRTT value to the set maximum SRTT value.

In another aspect, a method of providing improved throughput on delay-based congestions is described. The method comprises receiving the RTT value and determining a smoothed RTT (SRTT) value using the RTT value and one or more moving average functions. The method also comprises, if the SRTT value is smaller than a set minimum SRTT value, assigning the SRTT value to the set minimum SRTT value. The method further comprises, if the SRTT value is larger than a set maximum SRTT value, assigning the SRTT value to the set maximum SRTT value.

In yet another aspect, a non-transitory computer readable storage medium is described. The storage medium stores a set of instructions that are executable by at least one processor of an apparatus to cause the apparatus to perform a method of providing improved throughput on delay-based congestions. The method comprises receiving the RTT value and determining a smoothed RTT (SRTT) value using the RTT value and one or more moving average functions. The method also comprises, if the SRTT value is smaller than a set minimum SRTT value, assigning the SRTT value to the set minimum SRTT value. The method further comprises, if the SRTT value is larger than a set maximum SRTT value, assigning the SRTT value to the set maximum SRTT value.

BRIEF DESCRIPTION OF THE DRAWINGS

Reference will now be made to the accompanying drawings showing example embodiments of this disclosure. In the drawings.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide an apparatus and method of providing improved throughput control under delay-based congestion situation in a network. The improved throughput control can be realized by determining minimum and maximum SRTT values and choosing a congestion window based on a position of a current SRTT between the minimum and maximum SRTT values. The minimum and maximum SRTT values are determined based on SRTT by applying a measured RTT value into exponential moving average function.

Loss-based congestion handlers use packet loss information as a signal for congestion, whereas delay-based congestion handlers continuously measure RTT values and make congestion decisions based on variations in RTT measurements. These types of congestion handlers are further described below.

Delay jitter, which is considered as variations in packet delay in the present disclosure, has been common with almost all cellular or wireless technologies. This delay jitter is caused by built-in layer 2 (L2) retransmission mechanisms, which are in place to deal with random loss of packets caused by radio networks. Delay-based congestion handlers typically use minimum and maximum observed RTT values as references for congestion window size calculations. In the congestion window size calculations, it assumes that any increase from a minimum RTT value is caused by increased router queue latency, and is an indication of congestion. It is also assumed that a maximum RTT value is the sum of path RTT and maximum queue latency. The maximum queue latency can be measured by maximum buffer size available to the connection.

In wireless networks, the above mentioned retransmission mechanisms cause random changes to RTT on the connected path, hence causing the delay-based congestion handler to function incorrectly. A typical problem is the congestion handler to back off, when a measured RTT value increases just because of delay jitter caused by L2 retransmission mechanisms. Also, when a measured maximum RTT value, due to latency added by L2 retransmission mechanisms, is bigger than path RTT plus maximum queue latency, the delay-based congestion handlers can be over aggressive.

Thus, the present disclosure proposes embodiments for improving the functionality of congestion controllers when delay jitter is present. For example, the embodiments include providing a better estimate of congestion based on a position of a current SRTT value between the minimum and maximum SRTT values.

Figure 1:
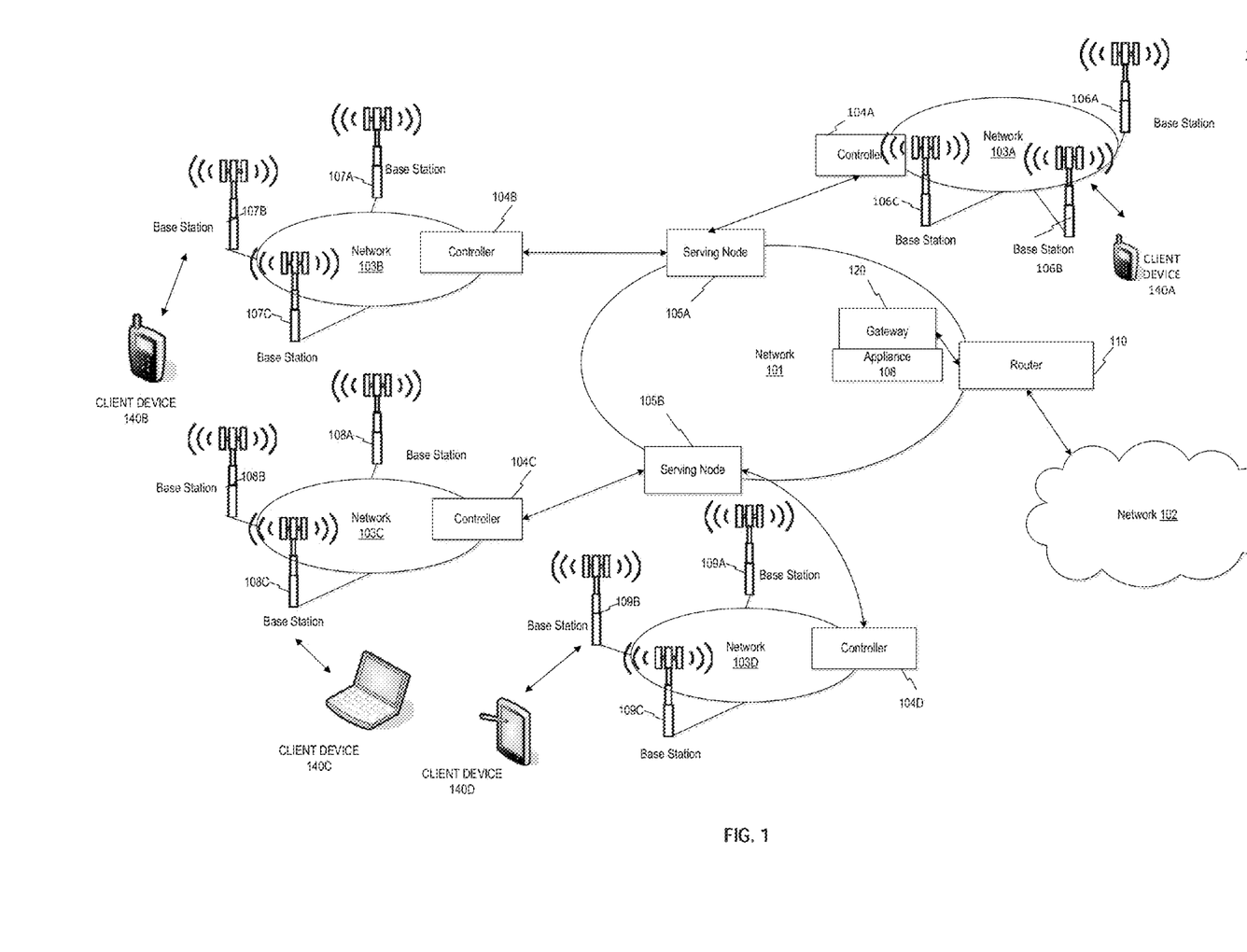
FIG. 1 is a block diagram of an exemplary communication system, consistent with embodiments of the present disclosure.

FIG. 1 is a block diagram of an exemplary communication system 100, consistent with embodiments of the present disclosure. Exemplary communication system 100 can be any type of system that transmits data packets over a network. For example, the exemplary communication system 100 can include one or more networks transmitting data packets across wired or wireless networks to client devices 140 (e.g., 140A-D). The exemplary communication system 100 can have network architectures of, for example, Global System for Mobile communications (GSM) network, Universal Mobile Telecommunications System (UMTS) network that adopts Wideband Code Division Multiple Access (W-CDMA) radio access technology, Long Term Evolution (LTE) network, $5^{th}$ Generation (5G) network, CDMA 2000 network, and Worldwide Interoperability for Microwave Access (WiMAX) network.

The exemplary communication system 100 can include, among other things, one or more client devices 140(A-D), one or more networks 101, 102, 103(A-D), one or more controllers 104(A-D), one or more serving nodes 105(A-B), one or more base stations 106(A-C)-109(A-C), a router 110, a gateway 120, and an appliance 108. At a high level, the network topology of the exemplary communication system 100 can have a tree-like topology, for example, with gateway 120 being the tree's root node and base stations 106-109 being the leaves.

One or more client devices 140A-D are devices that can acquire remote services from one or more networks through various communication paths. Client devices 140A-D can communicate with a target network passing through a plurality of network elements. For example, client device 140A can communicate with a network 102 via base station 106B, controller 104A, serving node 105A, gateway 120, appliance 108 and router 110. Client devices 140A-D are portrayed as mobile smart phones (e.g., client devices 140A and 140B), a laptop (e.g., client device 140C), and a tablet (e.g., client device 140D). It is appreciated that client device 140A-D could be any type of device (e.g., wearable or smart watch or "thing" in the Internet of Things sense) that communicates packets to and from a network.

Network 101 can be any combination of radio network, wide area network (WAN), local area networks (LAN), or wireless core network suitable for packet-type communications, such as Internet communications. For example, in one exemplary embodiment, network 101 can be a General Packet Radio Service (GPRS) core network, which provides mobility management, session management and transport for data services in GSM and W-CDMA networks. The exemplary network 101 can include, among other things, a router 110, a gateway 120, and one or more serving nodes 105(A-B)

Router 110 is a device that is capable of forwarding data packets between networks, creating an overlay inter-network. Router 110 can be connected to two or more data lines from different networks. When a data packet comes in on one of the lines, router 110 can determine the ultimate destination of the data packet and direct the packet to a next network on its journey. In other words, router 110 can perform "traffic directing" functions. In the exemplary embodiment shown in FIG. 1, router 110 communicates with network 102 and gateway 120. Router 110 directs traffic from the network 102 to the gateway 120 and vice versa.

Gateway 120 is a device that converts formatted data provided in one type of network to a particular format required for another type of network. Gateway 120, for example, may be a server, a router, a firewall server, a host, or a proxy server. Gateway 120 has the ability to transform signals received from router 110 into signals that network 101 can understand and vice versa. Gateway 120 may be capable of processing webpage, image, audio, video, and T.120 transmissions alone or in any combination, and is capable of full duplex media translations. As an exemplary embodiment, gateway 120 can be a Gateway GPRS Support Node (GGSN) that supports interworking between the GPRS network and external packet switched networks, like the Internet and X.25 networks. As another exemplary embodiment, gateway 120 can be a packet data network gateway that supports allocating IP address of user equipment, per-user based packet filtering, packet screening, service level charging, and so on.

Serving nodes 105 are devices that deliver data packets from gateway 120 to a corresponding network 103 within its geographical service area and vice versa. Serving node 105 can be a server, a router, a firewall server, a host, or a proxy server. Serving node 105 can also have functions including packet routing and transfer, mobility management (attach/detach and location management), logical link management, network accessing mediation and authentication, and charging functions. As an exemplary embodiment, a serving node 105 can be an SGSN. SGSN can have location register, which stores location information, e.g., current cell, current visitor location and user profiles, e.g., International Mobile Subscriber Identity (IMSI), and addresses used in packet data network, of all GPRS users registered with this SGSN. As another exemplary embodiment, a serving node 105 can be a serving gateway that supports local mobility anchor point for inter-evolved NodeB handover, packet routing and forwarding, idle mode downlink packet buffering and initiating network initiated service requests.

Network 102 can include any combination of WANs, LANs, or wireless networks suitable for packet-type communications. In some exemplary embodiments, network 102 can be, for example, Internet and X.25 networks. Network 102 can communicate data packet with network 101 with or without router 110.

Networks 103 can include any radio transceiver networks within UMTS or LTE network or any other wireless networks suitable for packet-type communications. In some exemplary embodiments, depending on underlying transport technology being utilized, Radio Access Network (RAN) or Backhaul area of network 103 can have a ring topology. In some embodiments, network 103 can be RAN in LTE system or Backhaul area of UMTS system. The exemplary network 103 can include, among other things, base stations 106-109 (e.g., base transceiver stations (BTSs), Node-Bs, or evolved Node-Bs). The exemplary network 103 can further include, among other things, one or more controllers 104 (A-C) (e.g., base-station controllers (BSCs) or radio network controllers (RNCs)). Client devices 140 (A-D) communicate with BTS/Node-B/evolved Node-Bs which have radio transceiver equipment. BTS/Node-Bs communicate with BSC/RNC, which are responsible for allocation of radio channels and handoffs as users move from one cell to another. Evolved Node-B itself can perform functionality of controller 104, e.g., allocation of radio channels and handoff. The BSC/RNC or evolved Node-B in turn communicate to serving nodes 105A-B, which manage mobility of users as well as provide other functions such as mediating access to the network and charging. In some embodiment, exemplary network 103 can correspond to $5^{th}$ Generation (5G) mobile network and base stations 106-109, controllers 104(A-C), client devices 140(A-D) will correspond to the 5G equivalents.

As shown in FIG. 1, appliance 108 is a device that optimizes data traffic by including, for example, a quality of service ("QoS") engine 310, a congestion controller 320, and a packet engine 330. In some embodiments, appliance 108 optimizes various types of network traffic, such as LAN traffic, WAN traffic, metropolitan area network (MAN) traffic, or wireless network traffic. Appliance 108 can optimize network traffic by, for example, scheduling data packets in an established communication link so that the data packets can be transmitted or dropped at a scheduled time and rate.

Appliance 108 can use Transmission Control Protocol (TCP) congestion avoidance algorithms, commonly called "TCP flavors," to optimize TCP data flows. TCP flavors improve quality of service across TCP connections by avoiding packet loss, connection failure due to TCP traffic congestion, unnecessarily frequent retransmissions. Common examples of TCP avoidance flavors include algorithms such as TCP Vegas, TCP Reno, TCP NewReno, TCP Hybla, TCP BIC, and TCP CUBIC, among others. Each TCP congestion avoidance flavor is suited for optimizing data flows originating from or received by particular operating systems, link types, and/or other network characteristics. For example, "Compound TCP," the default TCP flavor in a recent Microsoft™ Windows™ operating system uses queuing delay and packet loss as the feedback signal. "CUBIC TCP," the default TCP flavor in many Linux™-based systems uses packet loss as the feedback signal. But a single TCP flavor may not suit multiple data flow conditions, which can dynamically change with time based on data flow considerations like RTT, total packet loss, etc. For example, a link using "TCP flavor A" may be suited for the flow conditions on a static (dedicated/proxied) link shared between appliances 108, or between appliance 108 and other network element. Over time the same link can become heavily loaded and congested, and "TCP flavor A" may become a poor choice for the current TCP characteristics. Instead, "TCP flavor B" may be optimal to minimize packet loss, and maximize packet throughput and RTTs. So, appliance 108 can monitor and detect dynamic TCP characteristics and determine optimal TCP flavor based on dynamic TCP characteristics.

In some embodiments, appliance 108 is a physical device, such as Citrix System's ByteMobile™, Netscaler™, or CloudBridge™. In some embodiments, appliance 108 can be a virtual appliance. In some embodiments, appliance 108 can be a physical device having multiple instances of virtual machines (e.g., virtual Branch Repeater). The functionality of gateway 120 and appliance 108 can be located in a single physical device. In some embodiments, appliance 108 can be deployed as a separate network element between gateway 120 and router 110. In some embodiments, appliance 108 can be deployed at one or more locations within communication system 100, including various locations within network 101, 102 and 103. In some embodiments, appliance 108 can be located at gateway 120, at controller 104, at one or more base stations 106-109, or any other locations. Appliance 108 can be either a standalone network element or can be integrated into existing network elements such as gateway 120, controllers 104, and base stations 106-109. Appliance 108 can continuously monitor several parameters of communication system 100. The parameters can be used to control transmission or retransmission of one or more data packets. Appliance 108 can be deployed as or executed on any type and form of specific computing device (e.g., such as computing device 200 of FIGS. 2A-2B) capable of communicating on any type and form of network described herein. Appliance 108 is further described below corresponding to FIG. 3.

Figure 2A:
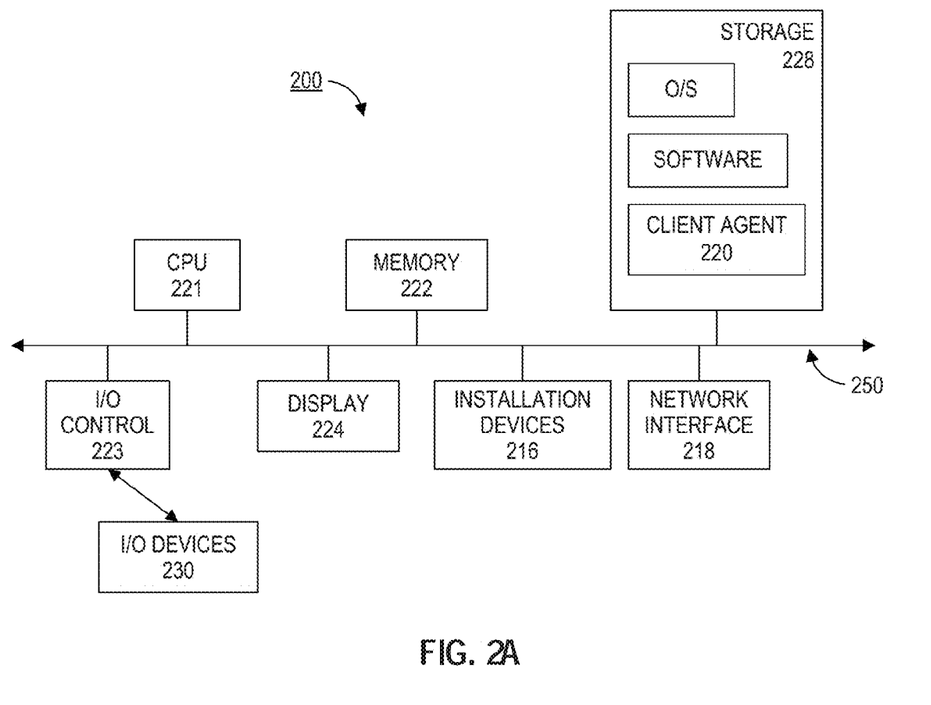
FIGS. 2A-2B are block diagrams of an exemplary computing device, consistent with embodiments of the present disclosure.
Figure 2B:
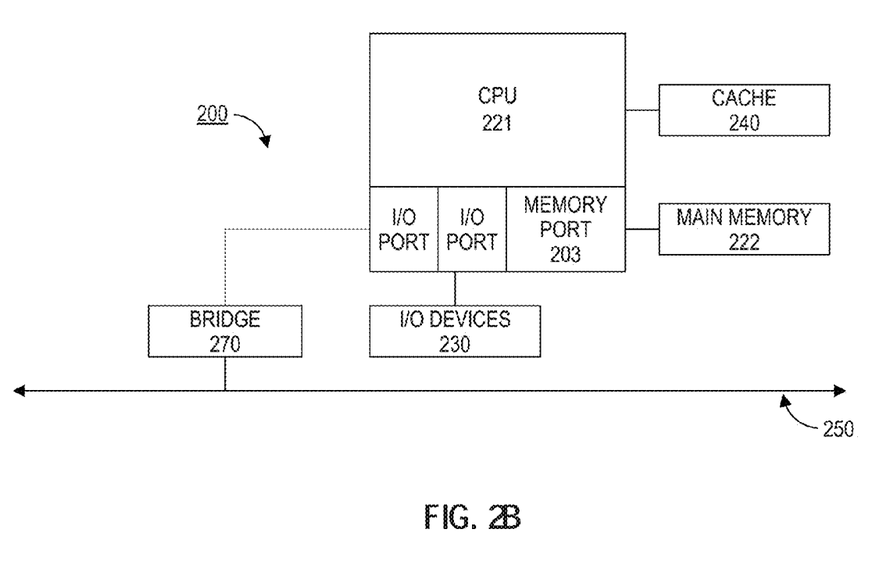

As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with main memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus (not shown), sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port (not shown). In further embodiments, I/O device 230 can be a bridge 270 between system bus 250 and an external communication bus, such as a USB bus, an Apple Desktop Bus, an RS-232 serial connection, a SCSI bus, a FireWire™ bus, a FireWire 800™ bus, an Ethernet bus, an AppleTalk™ bus, a Gigabit Ethernet bus, an Asynchronous Transfer Mode bus, a HIPPI bus, a Super HIPPI bus, a SerialPlus bus, a SCI/LAMP bus, a FibreChannel™ bus, or a Serial Attached small computer system interface bus, or some other type of data bus.

As shown in FIG. 2A, computing device 200 can support any suitable installation device 216, such as a disk drive or other input port for receiving one or more computer-readable media such as, for example, a USB device, flash drive, SD memory card; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of links including, but not limited to, standard telephone lines, LAN or WAN links (e.g., 802.11, T1, T3, 56 kb, X.25), broadband links (e.g., ISDN, Frame Relay, ATM), wireless connections (Wi-Fi, Bluetooth, Z-Wave, Zigbee), or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein. In some embodiments, appliance 108 can be a hardware chassis that can host multiple instances of computing device 200 in a form of blades.

Figure 3:
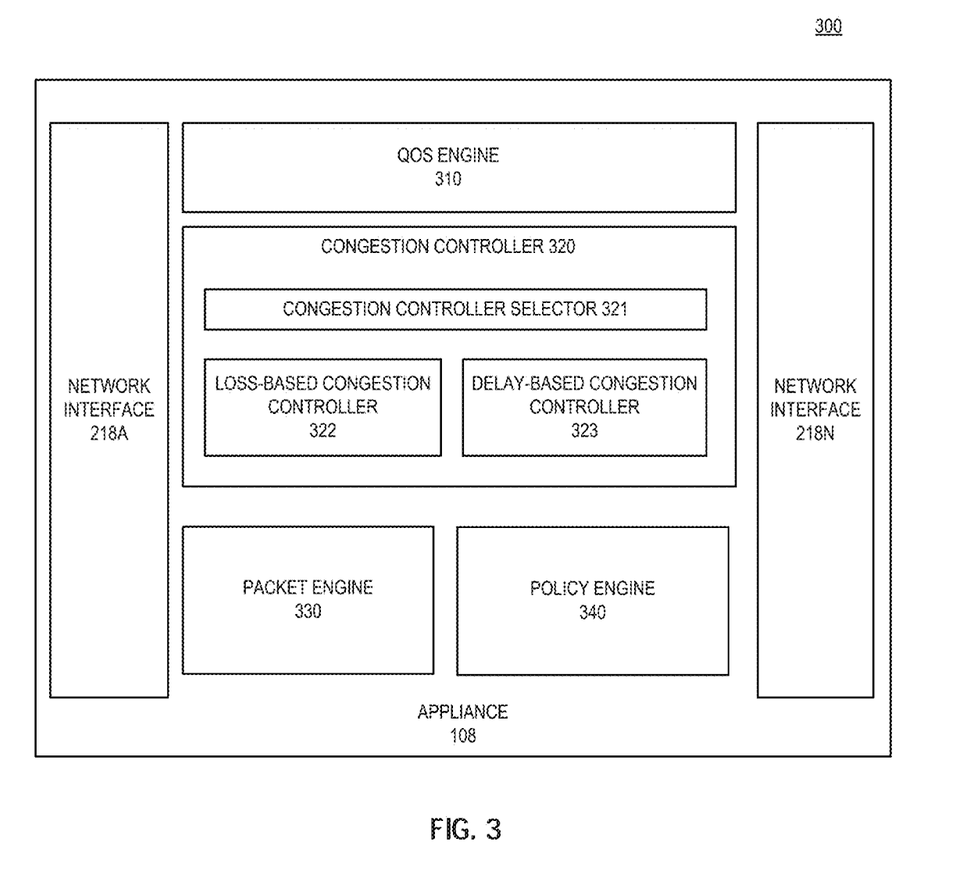
FIG. 3 is a block diagram of an exemplary appliance 108, consistent with embodiments of the present disclosure.

FIG. 3 is a block diagram of an exemplary appliance 108, consistent with embodiments of the present disclosure. Appliance 108 can include one or more network interfaces 218A-N consistent with network interface 218 of FIG. 2A, QoS engine 310, congestion controller 320, packet engine 330, and policy engine 340. In some embodiments, congestion controller 320 can comprise a congestion controller selector 321, a loss-based congestion controller 322, and a delay-based congestion controller 323. Although FIG. 3 depicts network interfaces 218A-218N as two network interfaces, it is appreciated that interfaces 218A-218N can include any number of network interfaces.

QoS engine 310, which is also referred to as a "QoS controller," or a "QoS packet scheduler," can perform one or more optimization (e.g., Quality of Service "QoS") techniques. QoS engine 310 can be one or more modules, which can be one or more packaged functional hardware units designed for use with other components or a part of a program that performs a particular function (e.g., optimization techniques) corresponding to the particular step of related functions. QoS engine 310 can be configured to improve the performance, operation, or quality of service of any type of network traffic. QoS engine 310 performs these techniques, for example, by using defined logic, business rules, functions, or operations. In some embodiments, QoS engine 310 can perform network traffic optimization and management mechanisms that provide different priorities to different users, applications, flows, or links. QoS engine 310 can also control, maintain, or assure a certain level of performance to a user, application, flow, or connection. For example, QoS engine 310 can control, maintain, or assure a certain portion of bandwidth or network capacity of a communication link for a user, application, one or more flows, or links, and/or collect data in connection with one or more flows and links, and analyze the collected data.

In some embodiments, QoS engine 310 can monitor the achieved level of performance or QoS (e.g., the data rate and delay) corresponding to a user, application, and/or flow, or link, and then dynamically control or adjust one or more QoS parameters in connection with sending and receiving data packets to achieve the desired level of performance or QoS. QoS engine 310 can direct congestion controller 320 or packet engine 330 to perform some or all of the steps according to exemplary embodiments disclosed herein. For example, QoS engine 310 can coordinate the acquisition and delivery of TCP characteristics between congestion controller 320 and packet engine 330. QoS engine 310 can also coordinate the acquisition and delivery of link characteristics between components of appliance 108, such as, for example, between congestion controller 320 and packet engine 330.

Congestion controller 320 can include any logic, function, or operations for detecting congestions and controlling data traffic entry into a network. Congestion controller 320 can be one or more modules, which can be one or more packaged functional hardware units designed for use with other components or a part of a program that performs a particular function corresponding to the particular step of related functions. In some embodiments, congestion controller 320 can detect congestions when packet loss has occurred. Alternatively, congestion controller 320 can make congestion decisions based on variations in RTT measurements.

Congestion controller 320 can act at TCP layer. Congestion controller 320 can acquire one or more TCP characteristics from packet engine 330 or congestion controller 320. TCP characteristics can include one or more characteristics that change with time, such as, for example, packet RTTs and/or the packet loss rate for a particular data flow, and/or an average queuing delay for the packets sent and received across a particular link. Congestion controller 320 can categorize loss-based TCP characteristics and delay-based TCP characteristics based on the acquired one or more TCP characteristics. Congestion controller 320 can comprise a congestion controller selector 321, which is configured to select at least one of loss-based congestion controller 322 and delay-based congestion controller 323. Congestion controller 320 can provide loss-based congestion controller 322 with loss-based TCP characteristics. Congestion controller 320 can provide delay-based congestion controller 323 with delay-based TCP characteristics. Congestion controller 320 can control data traffic entry into a network by taking resource reduction such as reducing transmission or retransmission rate of data packets under detection of congestion situations.

Loss-based congestion controller 322 can include any logic, function, or operations for controlling congestions owing to packet loss. Loss-based congestion controller 322 can be configured to send and receive flow information from packet engine 330, and/or QoS engine 310. Loss-based congestion controller 322 can acquire one or more TCP characteristics from packet engine 330 or congestion controller 320. Based on the one or more TCP characteristics, loss-based congestion controller 322 can determine congestion window to set an optimal multiple number of maximum segment size (MSS) allowed on connection. Loss-based congestion controller 322 can be one or more modules, which can be one or more packaged functional hardware units designed for use with other components or a part of a program that performs a particular function corresponding to the particular step of related functions.

Delay-based congestion controller 323 can include any logic, function, or operations for detecting congestions owing to retransmission of packets. Delay-based congestion controller 323 can be configured to send and receive flow information from packet engine 330, and/or QoS engine 310. Delay-based congestion controller 323 can acquire one or more TCP characteristics from packet engine 330 or congestion controller 320. TCP characteristics can include one or more characteristics that change with time, such as, for example, packet RTTs, an average queuing delay for the packets sent and received across a particular link. Based on the one or more TCP characteristics, delay-based congestion controller 323 can determine minimum and maximum SRTT. Because the flow characteristics change with time during congestion window size determination process, the selection is said to be "dynamic." Delay-based congestion controller 323 can be one or more modules, which can be one or more packaged functional hardware units designed for use with other components or a part of a program that performs a particular function (e.g., controlling and managing the processing of data packets) corresponding to the particular step of related functions.

Delay-based congestion controller 323 is configured to receive a measured RTT value including an initially measured RTT value, owing to retransmissions of a data packet. RTT values can be measured based on the time difference from transmitting the data packet to receiving an acknowledgement associated with the data packet. Delay-based congestion controller 323 is configured to pass the RTT value through an exponential moving average function. Delay-based congestion controller 323 determines an SRTT value, by applying an output of an exponential moving average value from the exponential moving average function, as an input to another exponential moving average value. Delay-based congestion controller 323 determines whether the SRTT value is smaller than a minimum SRTT value or bigger than a maximum SRTT value and assigns the SRTT value to a new minimum SRTT value or a new maximum SRTT value based on the determination.

SRTT is determined by feeding each measured RTT value to an exponential average function. Maximum and minimum SRTT values are recorded as the minimum and maximum of the output values of the exponential average after each RTT measurement. At initialization, a minimum SRTT value is set to 0 and a maximum SRTT should be set to an arbitrarily large value. The maximum and minimum SRTT values should not be recorded for a number of RTT samples (size of the exponential average filter) after initialization. Delay-based congestion handler 323 determines a congestion window value based on a position of a current SRTT between the minimum and maximum SRTT values. This calculation can be done once every RTT or more frequently.

In some embodiments, delay-based congestion controller 323 receives a measured RTT and passes RTT measurements through an exponential moving average function. Then, delay-based congestion controller 323 applies output of a first exponential moving average to a second exponential moving average in order to achieve an SRTT value. If the number of RTT samples is bigger than the moving average sample size and the SRTT value is smaller than a current minimum SRTT, delay-based congestion controller 323 assigns the SRTT value as a new minimum SRTT. If the number of RTT samples is bigger than the moving average sample size and the SRTT value is bigger than a current maximum SRTT, delay-based congestion controller 323 assigns the SRTT value as a new maximum SRTT. Delay-based congestion controller 323 can replace the current minimum SRTT with the new minimum SRTT, and the current maximum SRTT with the new maximum SRTT.

Packet engine 330, which is also referred to as a "packet processor," or a "data processor," is responsible for controlling and managing the processing of data packets received and transmitted by appliance 108 via network interfaces 218A-N. Packet engine 330 can be one or more modules, which can be one or more packaged functional hardware units designed for use with other components or a part of a program that performs a particular function (e.g., controlling and managing the processing of data packets) corresponding to the particular step of related functions. Packet engine 330 can be embodied as a single packet engine or any number of a plurality of packet engines that can operate at the data link layer (layer 2), network layer (layer 3), or the transport layer (layer 4) of a network protocol stack (e.g., such as the layers and protocols of the Open System Interconnection communications model). Packet engine 330 can be configured to accomplish some or all of the steps described herein after being executed by CPU 221 and/or QoS engine 310. In some aspects, the data packets can be carried over the data link layer via the Ethernet communication protocol, which can comprise any of the family of WAN or LAN protocols, such as those protocols covered by the IEEE 802.3. In other aspects, the network protocol stack can have any type and form of wireless protocols, such as IEEE 802.11 and/or mobile internet protocols. In some embodiments, packet engine 330 intercepts or receives data packets at the network layer, such as via the IP communication protocol. In some embodiments, packet engine 330 can intercept or receive data packets at the transport layer, such as via the TCP communication protocols. Packet engine 330 can also operate at any session or any application layer above the transport layer.

Packet engine 330 can include a buffer for queuing one or more data packets during processing of data packets. Additionally, packet engine 330 can communicate via one or more communication protocols to transmit, retransmit and receive a plurality of data packets across one or more links via network interfaces 218A-N. Packet engine 330 can be configured to acquire information regarding data flow and store the acquired information in an operatively connected computer memory. The transmitted, retransmitted and received data packets operating across one or more links can be considered "data flows" or "flows." In some embodiments, packet engine 330 can send scheduling requests to QoS engine 310 for scheduling of data packets received and stored at packet engine 330. After packet engine 330 receives responses from QoS engine 310, packet engine 330 can process the stored data packets according to their scheduled priorities.

In some embodiments, packet engine 330 can gather transport information and provide TCP characteristics for congestion controller 320, loss-based congestion controller 322, or delay-based congestion controller 323. For example, packet engine 330 can receive acknowledgement, negative acknowledgement, or other transmission error messages after transmitting or retransmitting data packets. Packet engine 330 can report such received message to congestion controller 320, loss-based congestion controller 322, or delay-based congestion controller 323. TCP characteristics can include one or more characteristics that change with time, such as, for example, packet RTTs and/or the packet loss rate for a particular data flow, an average queuing delay for the packets sent and received across a particular link, and/or congestion window information.

Also, packet engine 330 can direct congestion controller 320, loss-based congestion controller 322, or delay-based congestion controller 323 to perform any or all steps for determining transmission or retransmission of a data packet based on one or more TCP characteristics. Packet engine 330 can start an RTO timer whenever transmitting or retransmitting a data packet. Packet engine 330 can retransmit the data packet at expiry of the RTO timer, for example, when acknowledgement for the already transmitted data packet has not been received until the RTO timer expiry. Packet engine 330 can determine or acquire a new RTO value based on TCP characteristics from delay-based congestion controller 323. Packet engine 330 can replace a current RTO value with the new RTO value.

Packet engine 330 can have a delay jitter that is caused by a layer 2 retransmission of a data packet. Packet engine 330 can measure packet loss as a percentage of packets lost with respect to packets transmitted. Packet engine 330 can measure one or more RTTs. Packet engine 330 can determine one or more TCP characteristics of data flows based on the stored data or received information of acknowledgement, negative acknowledgement, or other transmission error message. One or more TCP characteristics, as discussed in further detail below, include one or more of information such as, for example, packet RTT and/or packet loss rate for a particular data flow, an average queuing delay and/or bandwidth delay for the packets sent and received across a particular link, and/or congestion window drop information, among other things.

During operations of appliance 108, packet engine 330 can interface, be integrated with, or be in communication with any portion of appliance 108, such as QoS engine 310, congestion controller 320, loss-based congestion controller 322, delay-based congestion controller 323, and/or policy engine 340. As such, any of the logic, functions, or operations of QoS engine 310, congestion controller 320, loss-based congestion controller 322, delay-based congestion controller 323, and/or policy engine 340 can be performed in conjunction with or in responsive to packet engine 330. CPU 221 can control and/or execute any operation described herein.

Appliance 108 can also include a policy engine 340, also referred to as a "policy controller" or a "policy provider." Policy engine 340 can include any logic, function, or operations for providing and applying one or more policies or rules to the function, operation, or configuration of any portion of the appliance 108. Policy engine 340 can be one or more modules, which can be one or more packaged functional hardware units designed for use with other components or a part of a program that performs a particular function corresponding to the particular step of related functions. In some embodiments, policy engine 340 provides a configuration mechanism to allow a user to identify, specify, define, or configure a policy for appliance 108, or any portion thereof. For example, policy engine 340 can provide a predefined traffic optimization configuration policy including the number of priorities, the priorities associated with each service class, the number of connections allowed under each service class, link bandwidth configuration, and any other policy information. Policy engine 340 can also include any logic, rules, functions, or operations for determining and providing access, control, and management of data packets received and stored by packet engine 330. Policy engine 340 can also include any logic, rules, functions, or operations for determining and providing access, control and management of security, network traffic, network access, compression, or any other function or operation performed by appliance 108.

Figure 4:
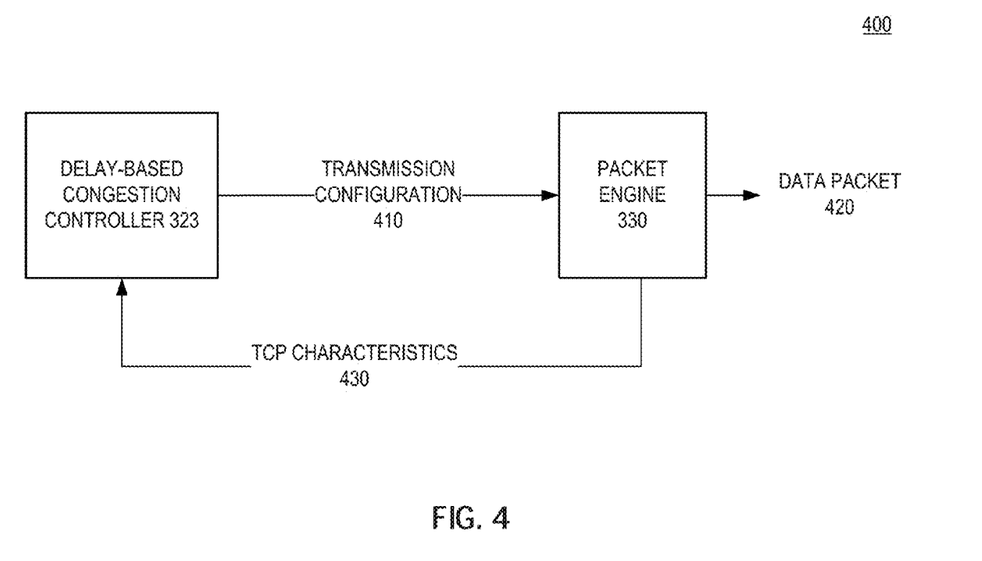
FIG. 4 is a block diagram of an exemplary embodiment for configuring transmission or retransmission of data packets under delay-based congestions situations, consistent with embodiments of the present disclosure.

FIG. 4 is a block diagram of an exemplary embodiment for configuring one or more transmission or retransmission parameters of data packets under delay-based congestions, consistent with embodiments of the present disclosure. For example, one or more transmission or retransmission parameters comprise an initial RTO value, a new RTO value, a sequence number of data packet to be retransmitted, number of retransmission, determined SRTT value, and/or determined minimum and maximum SRTT values. The initial RTO value can be a pre-configured fixed value or a measured RTT value after transmitting an initial data packet. Delay-based congestion controller 323 can be configured to receive, from packet engine 330 or congestion controller 320, one or more TCP characteristics such as a set of measured RTT values, average RTTs, and/or other information related with L2 retransmission.

Delay based congestion controller 323 can determine smoothed minimum and maximum RTT values, as well as a smoothed RTT value, based on the measured set of RTT values, and determine a congestion window size taking in account the delay jitter, calculated based on a position of a current SRTT, between the determined minimum and maximum SRTT values.

Figure 5:
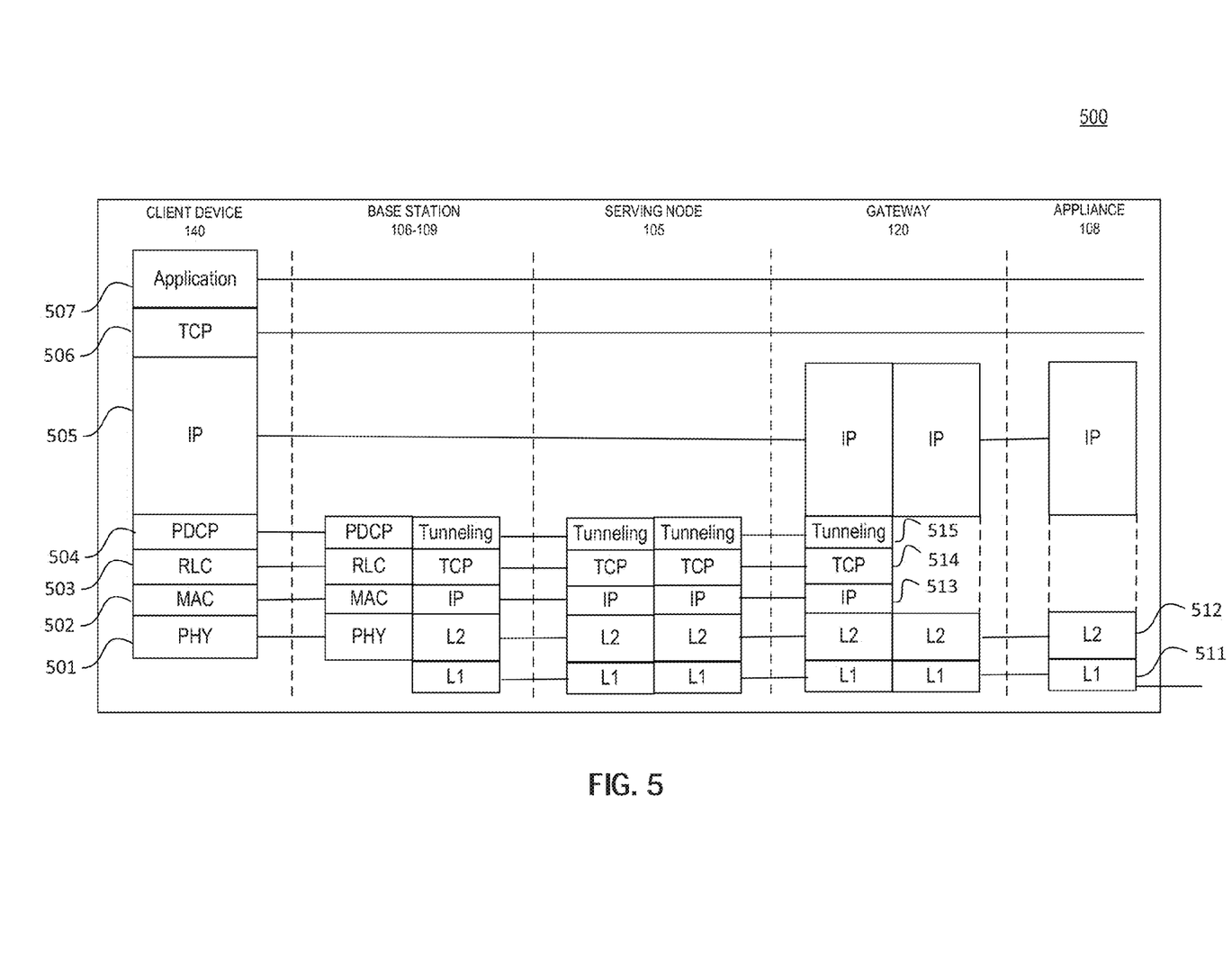
FIG. 5 is a block diagram of exemplary protocol stacks of communication system, consistent with embodiments of the present disclosure.

FIG. 5 is a block diagram of exemplary protocol stacks 500 of communication system 100, consistent with embodiments of the present disclosure. As an example, FIG. 5 shows communication system 100 comprising, among other things, client device 140, base station 106-109, serving node 105, gateway 120, and appliance 108. Client device 140 has a protocol stack comprising a physical (PHY) layer 501, a medium access control (MAC) layer 502, radio link control (RLC) layer 503, a packet data convergence protocol (PDCP) layer 504, an Internet Protocol (IP) layer 505, TCP layer 506, and an application layer 507. Base station 106-109 has relaying protocol stacks—one protocol stack communicating with client device 140 and having PHY layer 501, MAC layer 502, RLC layer 503, PDCP layer 504. The other protocol stack communicating with another network element (e.g., serving node 105) comprises a layer 1 (L1) 511, a layer 2 (L2) 512, an IP layer 513, a TCP layer 514, a tunneling layer 515. Serving node 105 has relaying protocol stacks—one protocol stack communicating with a network element of RAN (e.g., base station or base station controller), and the other protocol stack communicating another network element of core network (e.g., appliance 108, router 110, gateway 120). Gateway 120 has relaying protocol stacks—one protocol stack communicating with a network element of core network (e.g., serving node 105) and the other protocol stack communicating at appliance 108. The one protocol stack communicating with the network element of core network (e.g., serving node 105) comprises an L1 511, an L2 512, an IP layer 513, a TCP layer 514, a tunneling layer 515 and IP layer 505, The other protocol stack communicating at appliance 108 comprises an L1 511, an L2 512, and an IP layer 505. Appliance 108 has a protocol stack comprising an L1 511, an L2 512, and IP layer 505, respectively. When gateway 120 forwards data traffic to appliance 108, gateway 120 unbundles the data traffic from the tunnel.

PHY layer 501 and L1 511 are a lowest layer in protocol stack. PHY layer 501 and L1 511 consist of basic networking hardware transmission and technologies of a network. PHY layer 501 and L1 511 provide an electrical, mechanical and procedural interface to transmission medium. PHY layer 501 and L1 511 provides translating logical communication requests from RLC layer 503 or L2 512 into hardware-specific operations to affect transmission or reception of electronic signals.

MAC layer 502 provides addressing based on MAC address scheme and channel access control mechanisms and interfacing between RLC layer 503 and PHY layer 501. MAC layer 502 can also provide mapping between logical channels and transport channels, signaling of Automatic Retransmission reQuest (ARQ) or Hybrid ARQ (HARQ) feedback, and measuring and reporting channel quality.

RLC layer 503 provides receiving/delivering RLC data unit from/to upper layer (e.g., PDCP 504) and sending/receiving RLC data unit to/from a peer RLC entity (e.g., peer relationship of RLC layers 503 in client device 140 and in base station 106-109) via lower layers. RLC layer 503 can be implemented with ARQ protocol or HARQ protocol. That is, RLC layer 503 can transmit acknowledgement or negative acknowledgement depending on preconfigured transmission mode, upon receipt of RLC data unit from a peer RLC entity. RLC layer 503 can be configured to perform retransmitting RLC dada unit.

PDCP layer 504 provides transferring user plane data and control plane data, compressing/decompressing headers of IP data flows, ciphering/deciphering user plane data and control plane data, and doing integrity protection and integrity verification of user plane data. PDCP layer 504 can also provide acknowledged data transfer service including indication of successful delivery of PDCP packets, and unacknowledged data transfer service.

IP layer 505 and 513 provides delivering packets from a source host to a destination host solely based on IP addresses (e.g., Internet Protocol Version 4 and Internet Protocol Version 6) in packet headers.

TCP layer 506 and 514 provides connection-oriented communication incorporating reliable transmission of data packets. TCP protocol has backbone network protocols used for routing user data and control signalling. TCP must recover from data packet that is damaged, lost, duplicated, or delivered out of order by Internet communication system.

To achieve this, TCP layer 506 and 514 provides assigning a sequence number to each data packet transmitted and requiring an acknowledgement from a peer TCP entity. If not receiving an acknowledgement associated with a sequence number of a data packet within an RTO, TCP layer 506 and 514 retransmits the data packet with the sequence number. TCP layer 506 and 514 provides determining an initial RTO value, and a new RTO value whenever determining SRTT. TCP layer 506 and 514 also provides determining minimum and maximum SRTT to be used as a range for the initial RTO value and the new RTO value. Congestion controller 320, congestion controller selector 321, loss-based congestion controller 322 and/or delay-based congestion controller 323 particularly acts at TCP layer 514.

Application layer 507 can implement various application protocols, for example, HyperText Transfer Protocol (HTTP), File Transfer Protocol (FTP), Simple Mail Transfer Protocol (SMTP). Application layer 506 can supports a plurality of applications for end users, such as realtime applications, video streaming, file transfer, email application, and web service.

Tunneling layer 515 provides encapsulating IP packets when passing between network elements (e.g., between base stations 106-109 and serving node 105, and between serving node 105 and appliance 108), while keeping IP addresses in encapsulation.

Figure 6A:
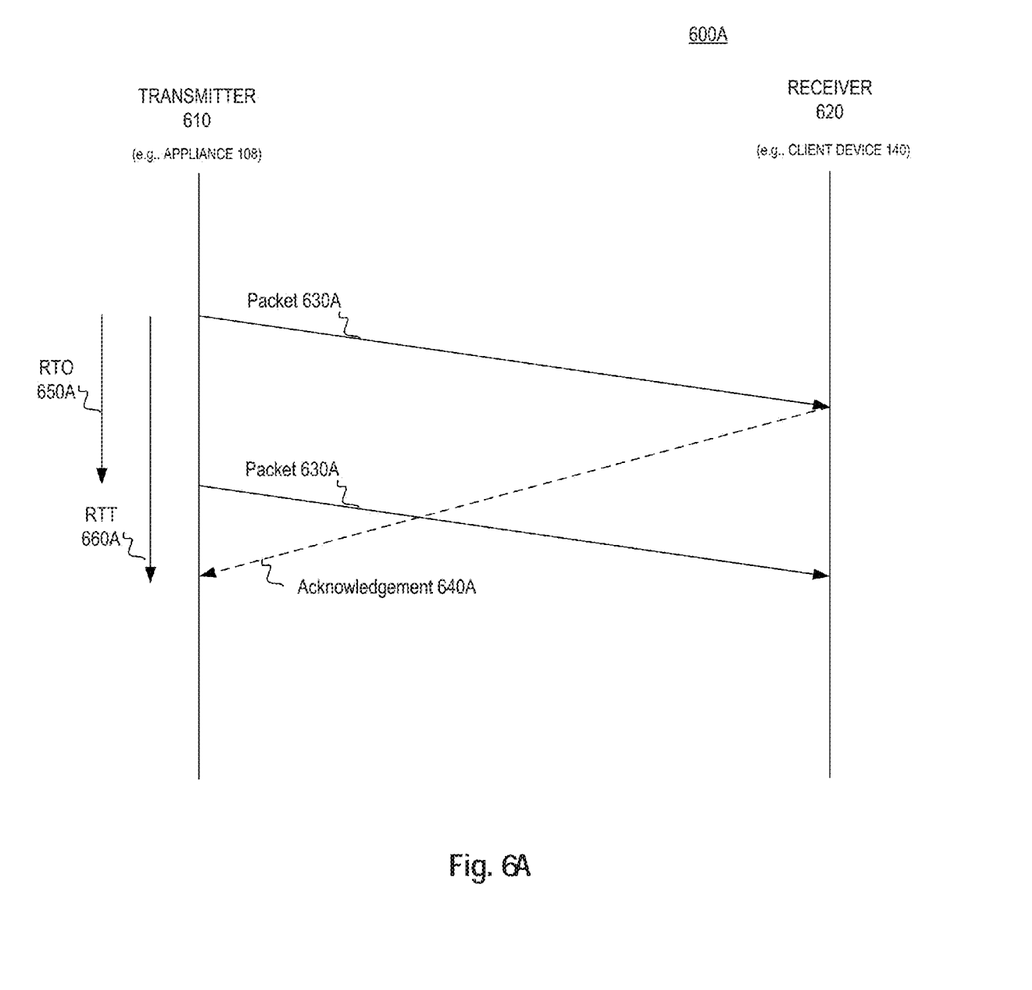
FIG. 6A is an illustrative message flow with short retransmission timeout (RTO), consistent with embodiments of the present disclosure.

FIG. 6A is an illustrative message flow 600A with a short RTO 650A timer, consistent with embodiments of the present disclosure. FIG. 6A shows a transmitter 610 transmitting a packet 630A, retransmitting the packet 630A at expiry of RTO 650A and then receiving an acknowledgement 640A from a receiver 620. That is, an RTO 650A timer value is shorter than a measured RTT 660A value, so retransmission of packet 630A has occurred before receiving an acknowledgement 640A. When RTO 650A timer value is too short and whenever RTO 650A timer is reset and expired, retransmission of packet 630A can occur each time, and this can unnecessarily cause a lot of traffic over the air and congestion in networks. In FIG. 6A, transmitter 610 can be appliance 108 or any network element having delay-based congestion controller 323. Receiver 620 can be client device 140 or any device receiving a packet sent from transmitter 610 and, upon receipt, capable of sending an acknowledgement to transmitter 610.

As an example of FIG. 6A, upon transmitting packet 630A to receiver 620, transmitter 610 starts running RTO 650A timer and monitors whether receiving, from receiver 620, acknowledgment 640A associated with packet 630A. If not receiving acknowledgment 640A associated with packet 630A until expiry of RTO 650A, transmitter 610 retransmits packet 630A upon expiry of RTO 650A. After expiry of RTO 650A, transmitter 610 can determine a new RTO value and replace the new RTO value to be used on next retransmission occurrence. Once receiving acknowledgement 640A, transmitter 610 can measure RTT 660A and use the measured RTT 660A as part of RTT samples to determine at least one of an SRTT, a minimum SRTT, or a maximum SRTT. The determining steps are illustrated in FIG. 7 below.

Figure 6B:
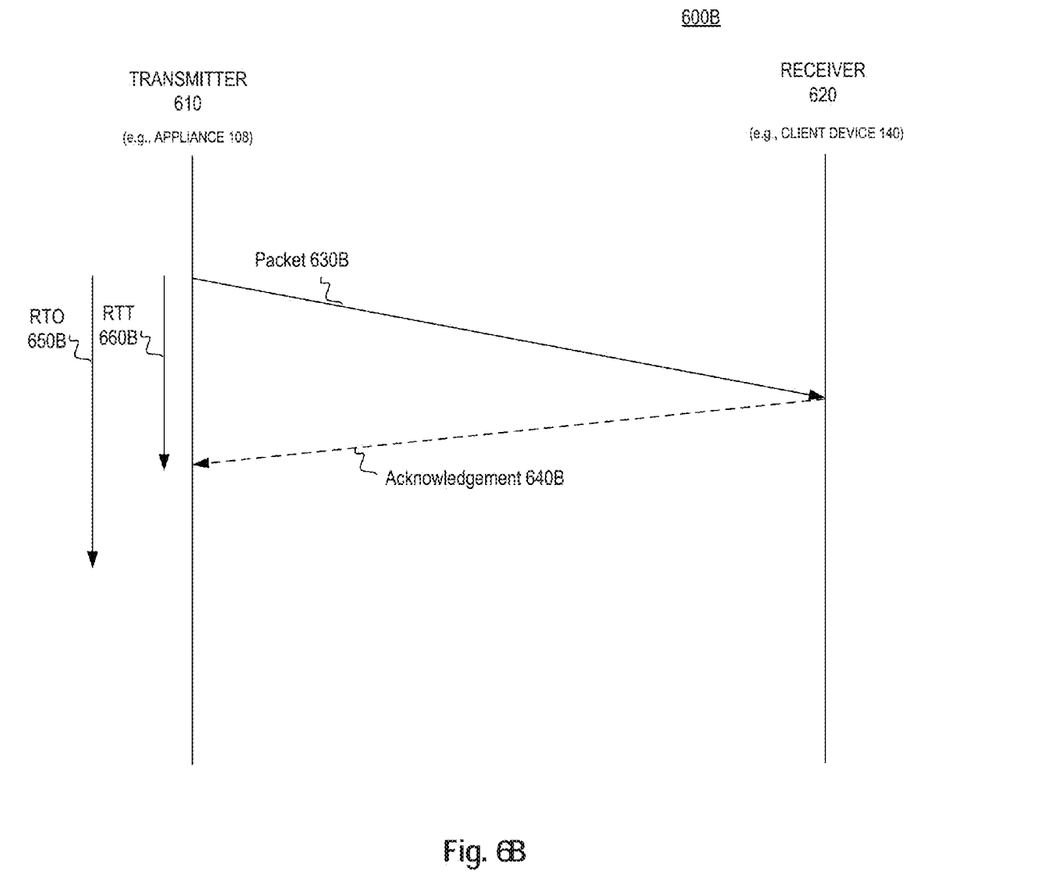
FIG. 6B is an illustrative message flow with long RTO, consistent with embodiments of the present disclosure.

FIG. 6B is an illustrative message flow 600B with a long RTO 650B timer, consistent with embodiments of the present disclosure. FIG. 6B shows a transmitter 610 transmitting a packet 630B and receiving an acknowledgement 640B from a receiver 620 before expiry of RTO 650B timer. FIG. 6B illustrates an RTO 650B timer value that is longer than a measured RTT 660B value, so response time at transmitter 610 can be longer in the event that the packet 660B has to be retransmitted. This can result in bad quality of service to users. In FIG. 6B, transmitter 610 can be appliance 108 or any network element having delay-based congestion controller 323. Receiver 620 can be client device 140 or any device receiving a packet sent from transmitter 610 and, upon receipt, capable of sending an acknowledgement to transmitter 610.

As an example of FIG. 6B, upon transmitting packet 630B to receiver 620, transmitter 610 starts running RTO 650B timer and monitors whether receiving, from receiver 620, acknowledgment 640B associated with packet 630B. Upon receipt of acknowledgement 640B or expiry of RTO 650B, transmitter 610 can determine a new RTO value and replace the new PTO value to be used on future occurrence to retransmit packet 630, when necessary. Once receiving acknowledgement 640B, transmitter 610 can measure RTT 660B and use the measured RTT 660B as part of RTT samples to determine at least one of an SRTT, a minimum SRTT, or a maximum SRTT. The determining steps are illustrated in FIG. 7 below.

Figure 7:
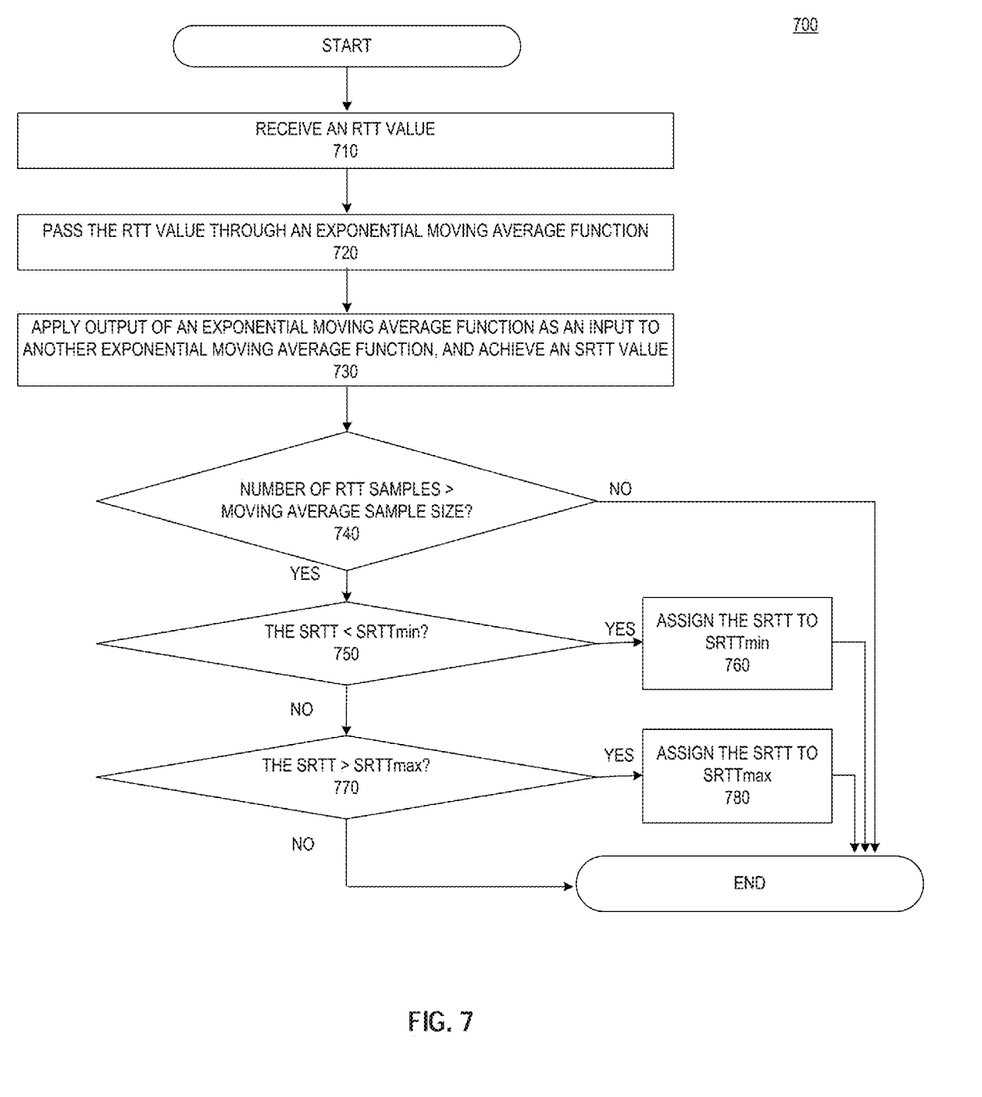
FIG. 7 is a flowchart representing an exemplary method of determining minimum and maximum SRTT values, consistent with embodiments of the present disclosure.

FIG. 7 is a flowchart representing an exemplary method 700 of determining minimum and maximum SRTT values, consistent with embodiments of the present disclosure. It will be readily appreciated that the illustrated procedure can be altered to delete steps or further include additional steps. While method 700 is described as being performed by appliance 108, it is appreciated that method 700 can be performed by other devices alone or in combination with appliance 108.

At an initial step 710, appliance 108 receives an RTT value. The number of RTT samples received is incremented with each new RTT sample. At step 720, appliance 108 passes the RTT value through a first exponential moving average function. An exponentially weighted moving average is a weighted average function that applies one or more weighting factors, e.g., an exponential smoothing factor, to the RTT value that decreases exponentially.

At step 730, appliance 108 applies the output of the first exponential moving average function as an input to a second exponential moving average function and achieves an SRTT value. Although two exponential moving average functions are provided in FIG. 7, it is appreciated that a single or more than two stages of exponential moving average function can also be used. It is appreciated that while exponential moving average functions are used in steps 720 and 730, other types of smoothing functions (e.g., moving average functions or otherwise) can be used.

Appliance 108 determines whether a number of RTT samples is bigger than a moving average sample size at step 740. The number of RTT samples is an incremental value of RTT measurements received. The number of RTT samples is how many times the receiving of an RTT value at step 710 has been executed. A moving average sample size is dependent on an exponential smoothing factor used. For example, with alpha being an exponential weight, i.e., a smoothing factor and N being the number of a moving average sample size, Alpha=2/(N+1). So for an alpha of 0.25, the number of a moving average sample size becomes 7.

When determining that the number of RTT samples is bigger than the moving average sample size, appliance 108 further determines whether the achieved SRTT is smaller than a minimum SRTT at step 750. If determining that the achieved SRTT is smaller than a minimum SRTT, appliance 108 assigns the achieved SRTT as a new minimum SRTT at step 760 and ends the process. If determining that the achieved SRTT is not smaller than a minimum SRTT, appliance 108 further determines whether the achieved SRTT is bigger than a maximum SRTT at step 770. When determining that the achieved SRTT is bigger than a maximum SRTT, appliance 108 assigns the achieved SRTT as a new maximum SRTT at step 780 and ends the process. When determining that the achieved SRTT is not bigger than a maximum SRTT, appliance 108 ends the process.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An apparatus of providing improved throughput on delay-based congestions comprising:
   a packet engine detecting a delay jitter that is caused by retransmission of a data packet, the packet engine configured to measure a round trip time (RTT) value;
   a delay-based congestion controller configured to:
   receive the RTT value;
   determine a smoothed RTT (SRTT) value using the RTT value and one or more smoothing functions;
   if the SRTT value is smaller than a set minimum SRTT value, assign the SRTT value to the set minimum SRTT value; and
   if the SRTT value is larger than a set maximum SRTT value, assign the SRTT value to the set maximum SRTT value.

2. The apparatus of claim 1, wherein the delay-based congestion controller is further configured to determine a congestion window size associated with the delay jitter, based on a position of the SRTT value between the new minimum SRTT value and the new maximum SRTT value.

3. The apparatus of claim 1, wherein the packet engine is further configured to provide the delay-based congestion controller with one or more transmission control protocol (TCP) characteristics.

4. The apparatus of claim 3, wherein the one or more TCP characteristics is used to determine the set minimum SRTT value and the set maximum SRTT value.

5. The apparatus of claim 1, wherein the SRTT value indicates a congestion level.

6. The apparatus of claim 1, wherein the delay-based congestion controller is further configured to determine a number of RTT samples based on a number of a plurality of RTT values received.

7. The apparatus of claim 6, wherein the delay-based congestion controller is further configured to determine a moving average sample size using an exponential smoothing factor associated with the one or more smoothing functions.

8. The apparatus of claim 7, wherein the delay-based congestion controller is further configured to determine that the number of the plurality of RTT values received is larger than the determined moving average sample size.

9. The apparatus of claim 8, wherein the delay-based congestion controller is configured to determine if the SRTT value is smaller than set minimum SRTT value or bigger than the set maximum SRTT value when the number of the plurality of RTT values received is determined to be bigger than the determined moving average sample size.

10. A method, performed by an apparatus, of providing improved throughput on delay-based congestions, the method comprising:
    receiving the RTT value;
    determining a smoothed RTT (SRTT) value using the RTT value and one or more smoothing functions;
    if the SRTT value is smaller than a set minimum SRTT value, assigning the SRTT value to the set minimum SRTT value; and
    if the SRTT value is larger than a set maximum SRTT value, assigning the SRTT value to the set maximum SRTT value.

11. The method of claim 10, further comprising determining a congestion window size associated with the delay jitter, based on a position of the SRTT value between the new minimum SRTT value and the new maximum SRTT value.

12. The method of claim 10, further comprising providing the delay-based congestion controller with one or more transmission control protocol (TCP) characteristics.

13. The method of claim 12, wherein the one or more TCP characteristics is used to determine the set minimum SRTT value and the set maximum SRTT value.

14. The method of claim 10, wherein the SRTT value indicates a congestion level.

15. The method of claim 10, further comprising determining a number of RTT samples based on a number of a plurality of RTT values received.

16. The method of claim 15, further comprising determining a moving average sample size using an exponential smoothing factor associated with the one or more smoothing functions.

17. The method of claim 16, further comprising determining that the number of the plurality of RTT values received is larger than the determined moving average sample size.

18. The method of claim 17, wherein determining that the SRTT value is smaller than a minimum SRTT value or bigger than a maximum SRTT value is performed when the number of the plurality of RTT values received is determined to be bigger than the determined moving average sample size.

19. A non-transitory computer readable storage medium that stores a set of instructions that are executable by at least one processor of an apparatus to cause the apparatus to perform a method of providing improved throughput on delay-based congestions, the method comprising: r
    receiving the RTT value;
    determining a smoothed RTT (SRTT) value using the RTT value and one or more smoothing functions;
    if the SRTT value is smaller than a set minimum SRTT value, assigning the SRTT value to the set minimum SRTT value; and
    if the SRTT value is larger than a set maximum SRTT value, assigning the SRTT value to the set maximum SRTT value.

* * * * *